(12) United States Patent
Veltri

(10) Patent No.: US 7,337,801 B2
(45) Date of Patent: Mar. 4, 2008

(54) VALVE

(75) Inventor: Jeffrey Allan Veltri, Burlington (CA)

(73) Assignee: V-Controls Inc., Taichung (TW)

( * ) Notice: Subject to any disclaimer, the term of this patent is extended or adjusted under 35 U.S.C. 154(b) by 0 days.

(21) Appl. No.: 11/511,094

(22) Filed: Aug. 28, 2006

(65) Prior Publication Data

US 2007/0079875 A1 Apr. 12, 2007

Related U.S. Application Data

(63) Continuation-in-part of application No. 11/247,926, filed on Oct. 10, 2005.

(51) Int. Cl.
*F16K 27/04* (2006.01)
(52) U.S. Cl. ..................................... 137/270
(58) Field of Classification Search ................ 137/270, 137/269
See application file for complete search history.

(56) References Cited

U.S. PATENT DOCUMENTS 4,901,749 A * 2/1990 Hutto .......................... 137/270
6,886,583 B2 * 5/2005 Matsushima et al. ....... 137/270

* cited by examiner

*Primary Examiner*—Kevin Lee
(74) *Attorney, Agent, or Firm*—C. G. Mersereau; Nikolai & Mersereau, P.A.

(57) ABSTRACT

A valve has a body, an outer shell and a bottom board. The outer shell contains a membrane and internal and external sliding bases with abutting stubs pressing the membrane. Channels are defined in the body and the sliding bases. The bottom board fits inside a rear of the body and has multiple apertures rotatably aligning the channels in the body to change "5-way, 2-position" or "3-way, 2-position" operation modes. Moreover, an electromagnetic valve with a shaft is installed inside the valve and cooperates with the movement of the sliding bases to selectively open or close the channels.

12 Claims, 17 Drawing Sheets

VALVE

This is a continuation-in-part (CIP) of U.S. patent application Ser. No. 11/247,926, filed on Oct. 10, 2005, which is incorporated herein by reference.

BACKGROUND OF THE INVENTION

1. Field of the Invention

The present invention relates to a valve, and more particularly to a valve that contains an electromagnetic valve inside to change positions of an interior abutting stub abutting a membrane for switching flow directions and further contains a bottom board adjustable to change operational modes of the valve.

2. Description of Related Art

A conventional valve in a US application filed on Oct. 10, 2005 by the present applicant and assigned in application Ser. No. 11/247,926, the disclosed valve comprises a body, an internal sliding base, an external sliding base, an outer shell and a membrane and can be changed in the flow directions by relocating the abutting stubs on the membrane. By having the designs of the conventional valve, the valve can be manufactured easily and has long lifespan.

Although the described patent submitted by the applicant overcomes the drawbacks of former conventional valve, its operational mode is only of 5 ways with 2 positions so that application of the valve is limited. Moreover, the electromagnetic valve is attached outside the body and needs additional securing device that causes more troubles in assembling the valve.

SUMMARY OF THE INVENTION

One main objective of the present invention is to provide a valve that is manufactured by a rapid plastic extruding process and has a 180° rotatable bottom board with a channel selectively communicated with entrances of a body to change different operational modes to have versatile applications.

Another main objective of the present invention is to provide a valve that has an electromagnetic valve installed inside to make the valve easy in manufacture, operated accurately and to have long lifespan.

To achieve the foregoing objective, the valve comprises:

an outer shell with an interior;

an external sliding base assembled inside-the interior of the outer shell and having two ends, a recess defined at one end, two outer abutting stubs formed at two opposite sides of the recess, two detents defined in the other end to respectively align the two outer abutting stubs;

a resilient body clamped between the outer shell and a middle between the two detents;

an internal sliding base engaging the external sliding base and having a sliding portion mounted in the recess in the external sliding base, two inner abutting stubs formed at a bottom of the sliding portion, a central shaft extending from the internal sliding base, and a through hole axially defined in the central shaft;

a positioning plate attached between the body and the outer shell and having multiple through holes defined in the positioning plate;

a body combined with the outer shell and has a first blind hole and a first positioning groove and a second positioning groove respectively defined at two opposite sides of the first blind hole, wherein each of the first and second positioning grooves has a first penetrating hole and a second penetrating hole; the first positioning groove has two ends defined with a second blind hole and a third blind hole respectively; the second positioning groove has two ends defined with a fourth blind hole and a fifth blind hole respectively; a first passageway communicates the third blind hole and the fifth blind hole; a second passageway communicates with the second blind hole; a third passageway communicates the fourth blind hole; a valve hole contains a first channel and a second channel communicated with the first passageway and the first blind hole respectively; an electromagnetic valve is installed inside the shell to control the valve hole;

two membranes respectively engaged the first positioning groove and the second positioning groove on the body, wherein two ends of each of the two membranes respectively have a stop portion to cover the second, third, fourth, or fifth blind hole; and a bottom board rotatably mounted on the body and having a first face with a first elongated hole, a second elongated hole, a third elongated hole, a fourth elongated hole and a fifth elongated hole, wherein the second elongated hole extends to a second face on the bottom board, the third elongated hole has a via hole extending to the second face of the bottom board, the fourth elongated is closed;

wherein, the two outer abutting stubs on the external sliding base penetrate two corresponding through holes on the positioning plate and each have a distal end to engage the third blind hole and the fourth blind hole on the body;

wherein, the two inner abutting stubs on the internal sliding base penetrates two corresponding through holes on the positioning plate and each have a distal end to engage the second blind hole and the fifth blind hole;

wherein, the central shaft on the internal sliding base sequentially penetrates one corresponding through hole on the positioning plate and the first blind hole in the body.

By rotating the bottom board, the valve can be changed between a "5-way, 2 position" operation mode and a "3-way, 2 position" operation mode.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
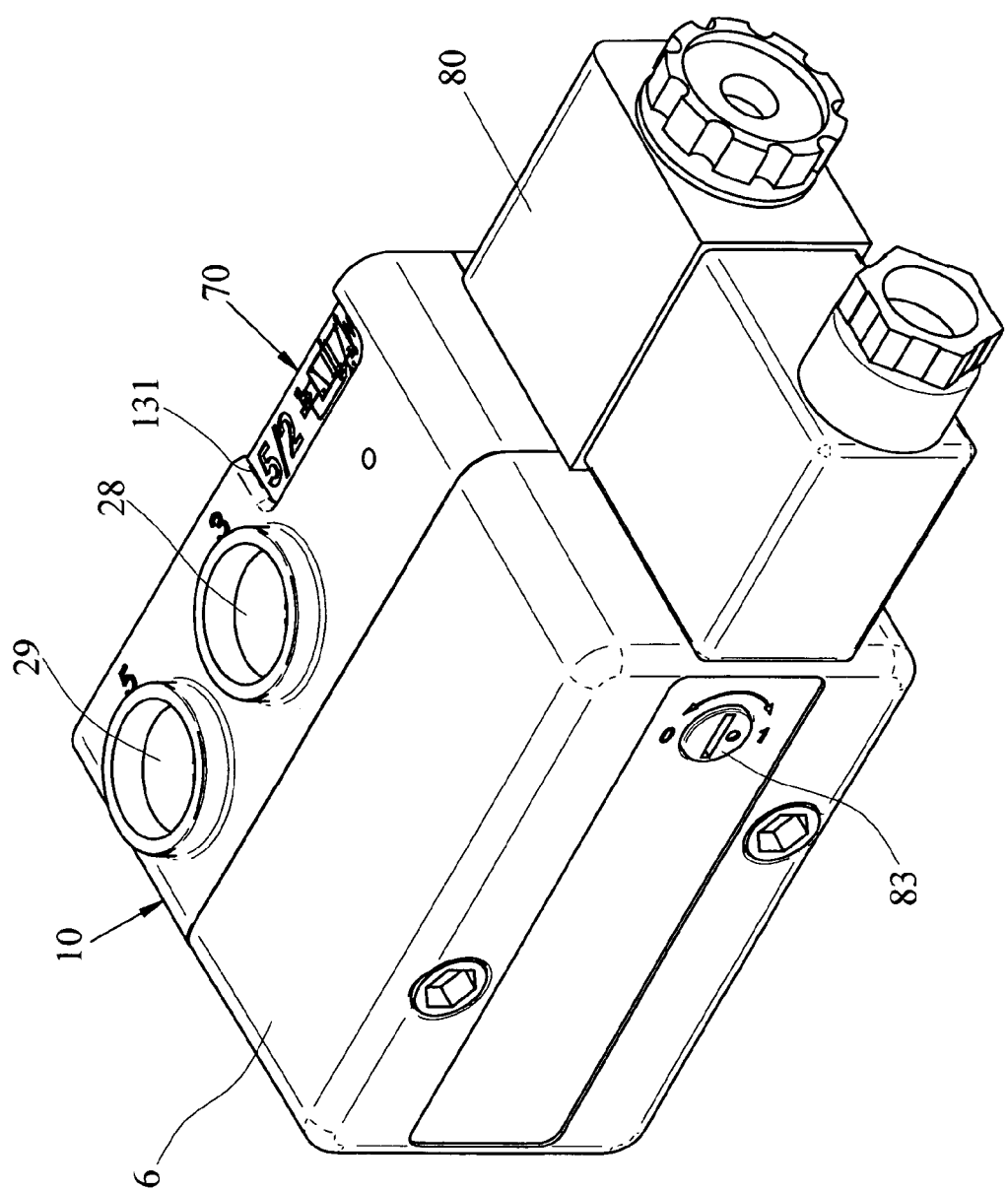
FIG. 1 is a perspective view of a valve in accordance with the present invention.

A valve in accordance with the present invention comprises a body, an outer shell and a bottom board. The outer shell contains a membrane and internal and external sliding bases with abutting stubs pressing the membrane. Channels are defined in the body and the sliding bases. A bottom board fits inside a rear of the body and has apertures rotatably aligning the channels in the body to change "5-way, 2-position" or "3-way, 2-position" operation modes. Moreover, an electromagnetic valve with a shaft is installed inside the valve and cooperates with the movement of the sliding bases to selectively open or close the channels.

With reference to FIGS. 1 to 11A and 11B, a preferred embodiment of the valve comprises: an outer shell 6, a body 10, two membranes 30, a positioning plate 40, a bottom board 70 and an electromagnetic valve 80.

Figure 5A:
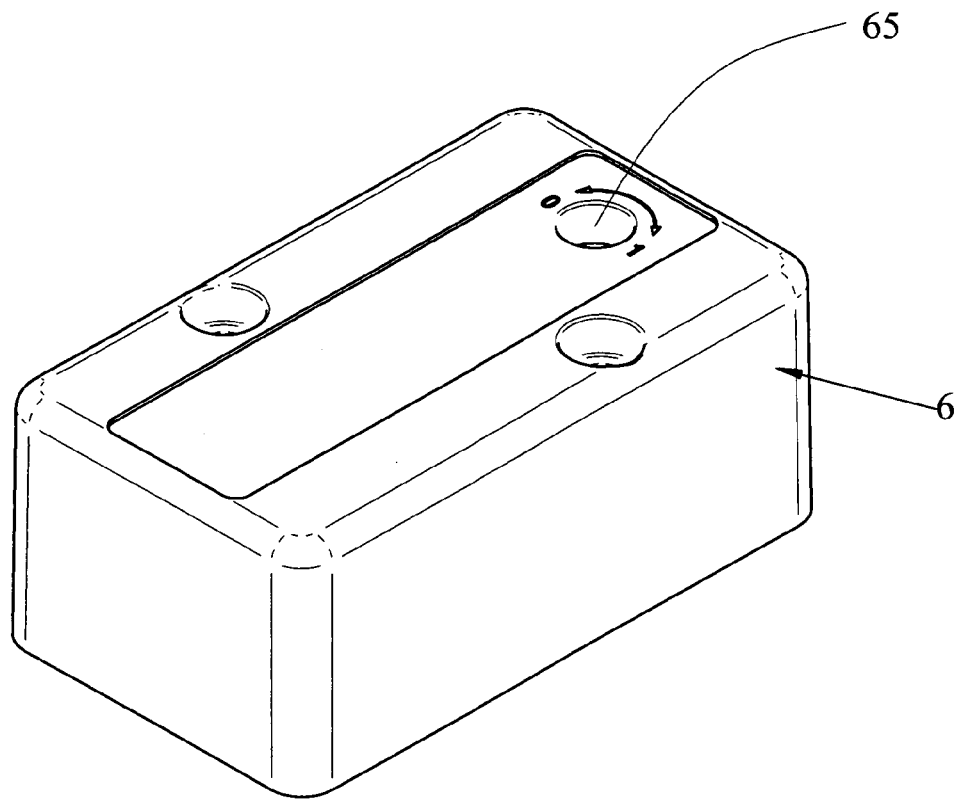
FIG. 5A is a perspective view of an outer shell of the valve in the present invention.
Figure 5B:
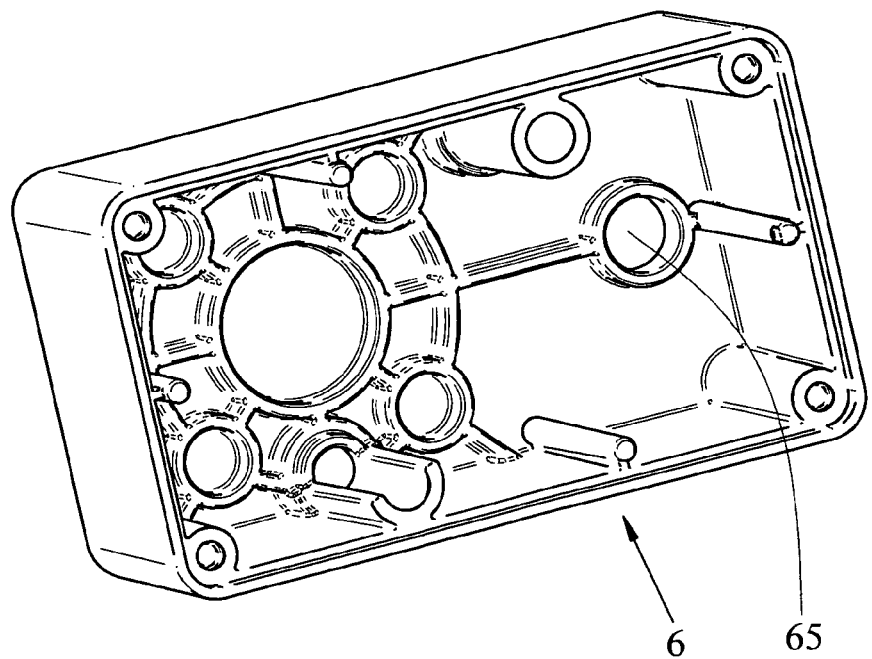
FIG. 5B is another perspective side view of the outer shell of the valve in opposite to FIG. 5A.
Figure 6A:
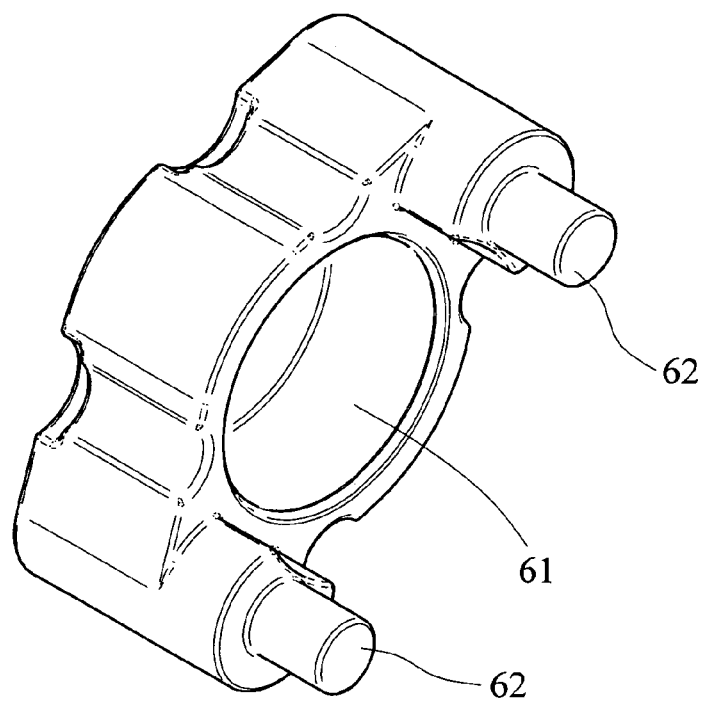
FIG. 6A is a perspective view of an external sliding base of the valve in the present invention.
Figure 6B:
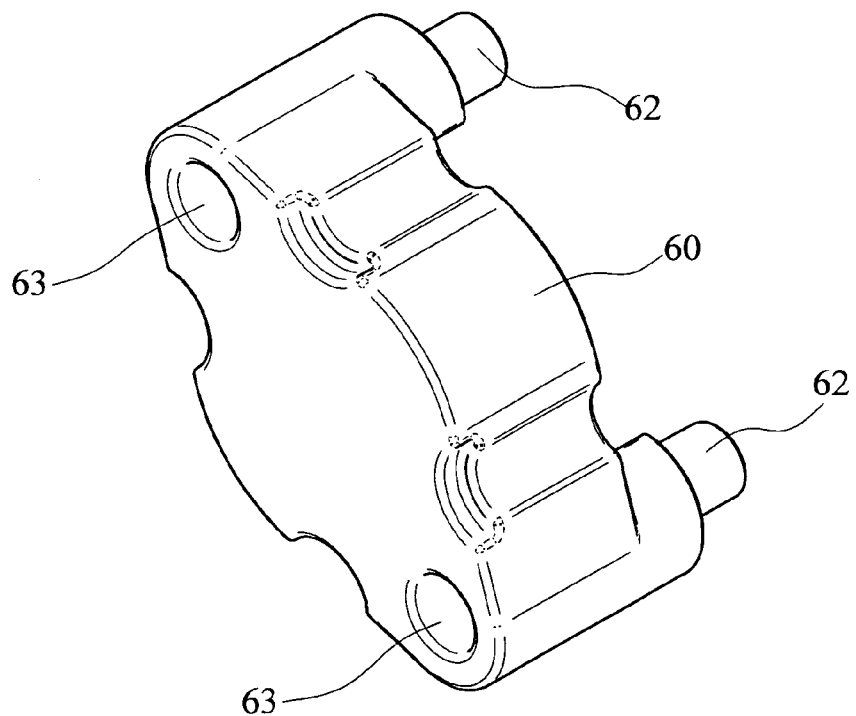
FIG. 6B is another perspective side view of the external sliding base of the valve in opposite to FIG. 6A.
Figure 7A:
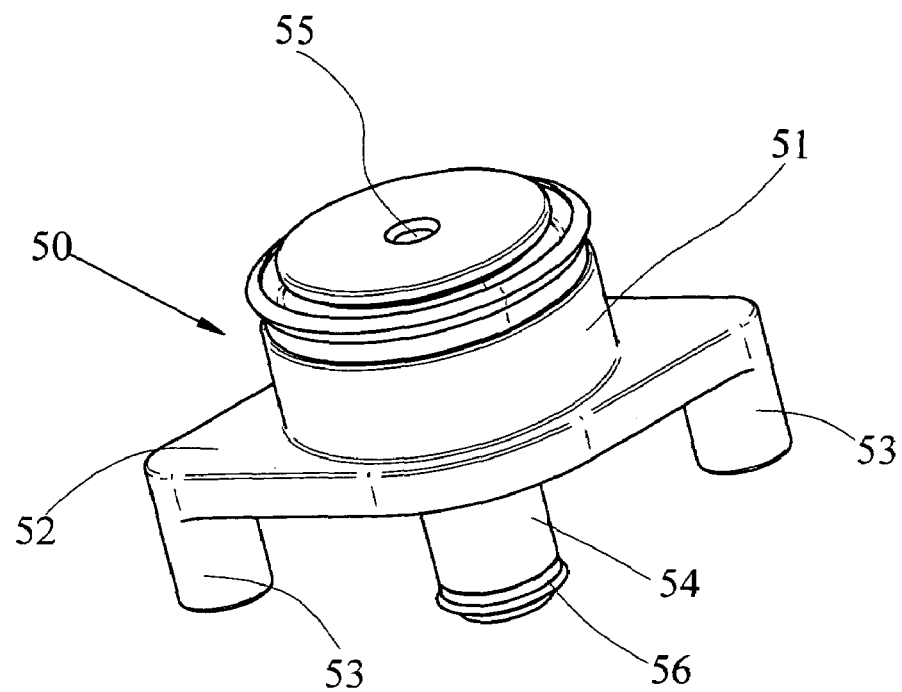
FIG. 7A is a perspective view of an-internal sliding base of the valve in the present invention.
Figure 7B:
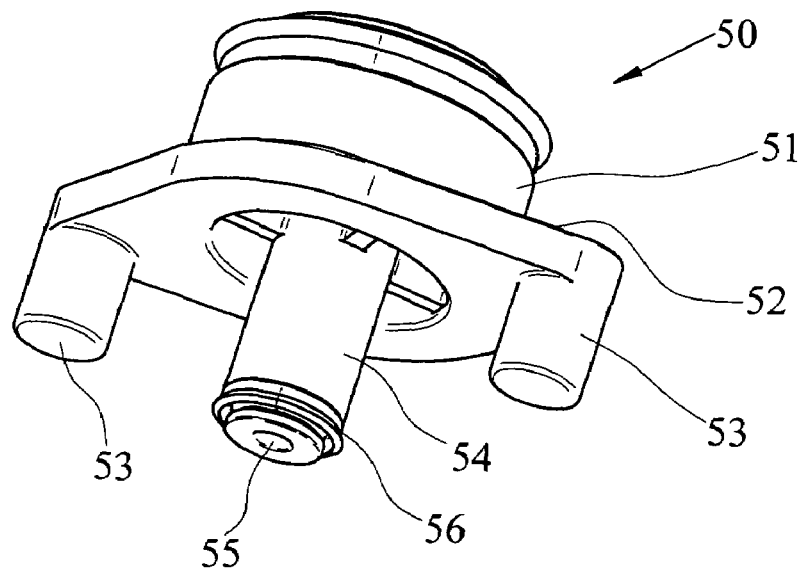
FIG. 7B is another perspective side view of the internal sliding base of the valve in opposite to FIG. 7A.
Figure 9:
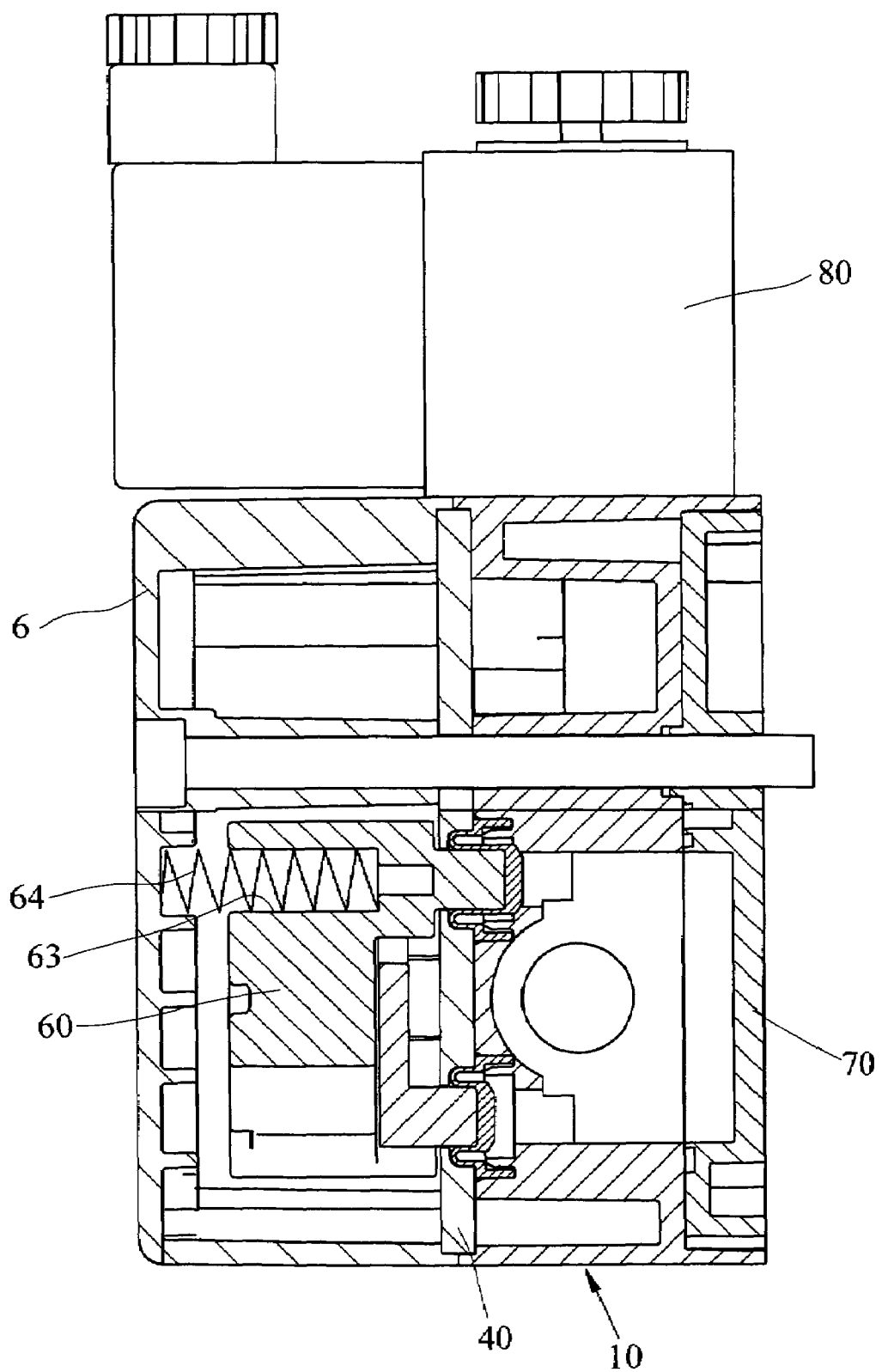
FIG. 9 is a cross-sectional side view of the valve in assembly.

The outer shell 6 (as shown in FIGS. 5A and 5B) has an interior. An external sliding base 60 (as shown in FIGS. 6A and 6B) is assembled inside the interior of the outer shell 6 and has a recess 61 and two outer abutting stubs 62 at two opposite sides of the recess 61. The two outer abutting stubs 62 align with a third blind hole 24 and a fourth blind hole 25 in the body 10 to clamp the two membrane 30. Two detents 63 are defined on the external sliding base 60 at an opposite face to respectively align with the two outer abutting stubs 62. An internal sliding base 50 (as shown in FIGS. 7A and 7B) has a sliding portion 51 with an O-ring to engage the recess 61 of the external sliding base 60. The sliding portion 51 has a bottom, a shoulder section 52 formed at the bottom, and two inner abutting stubs 53 formed at two opposite sides of the shoulder section 52. The two inner abutting stubs 53 align with a second blind hole 23 and a fifth blind hole 26 in the body 10 to clamp the two membrane 30. The internal sliding base 50 has a central shaft 52 penetrating a first blind hole 20 in the body 10 and having a distal end with an O-ring 56. The central shaft 52 further has a through hole 55. The outer shell 6 and the body 10 are correspondingly combined together by means of locking. An inner top face of the outer shell 6 and a middle between the two detents 63 on the external sliding base 60 clamp a resilient body 64 therebetween (as shown in FIG. 9).

Figure 2A:
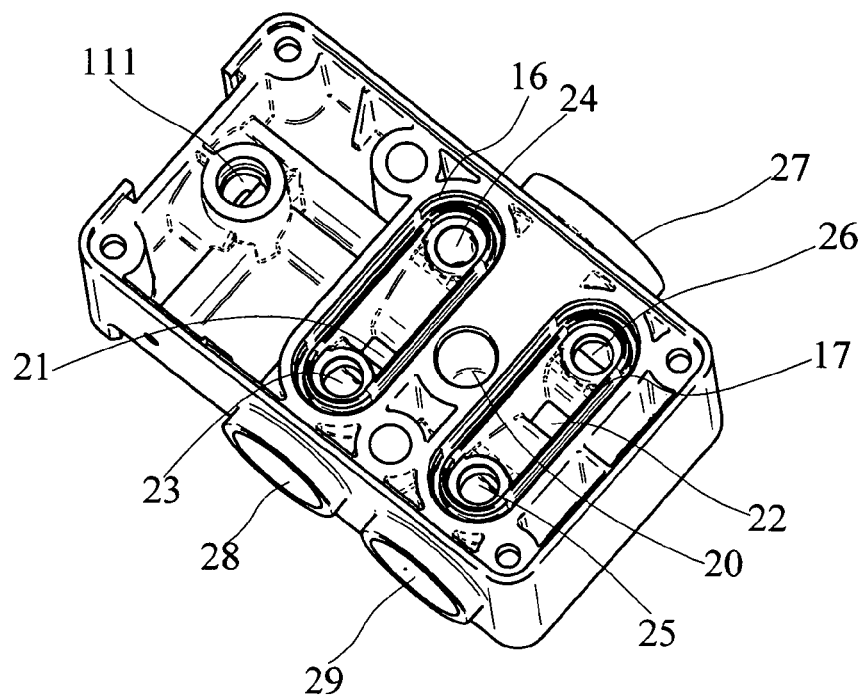
FIG. 2A is a perspective side view a body of the valve in FIG. 1.
Figure 2B:
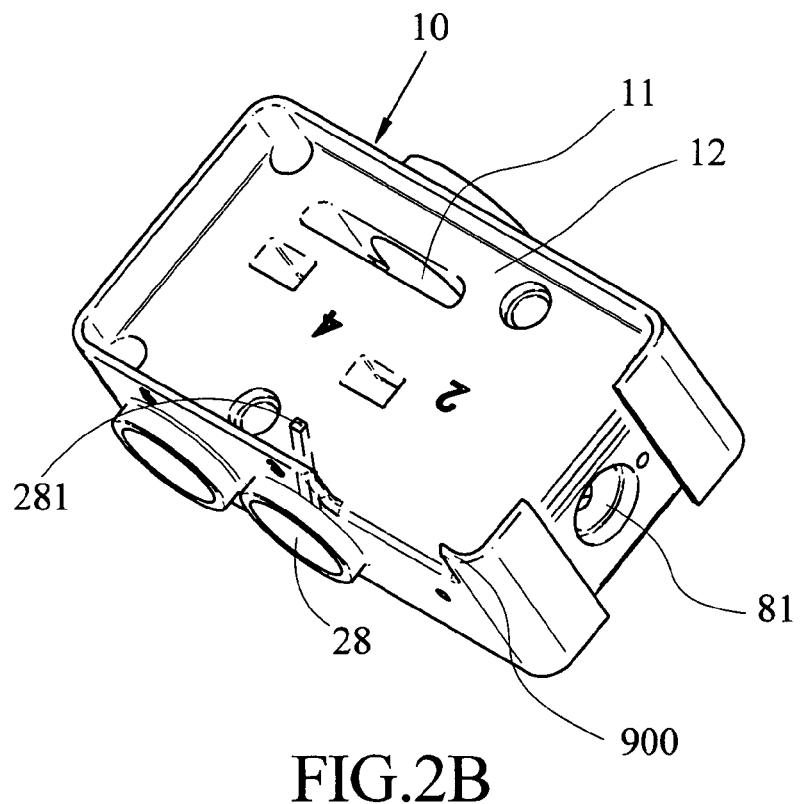
FIG. 2B is another perspective side view of the body of the valve in opposite to FIG. 2A.
Figure 2C:
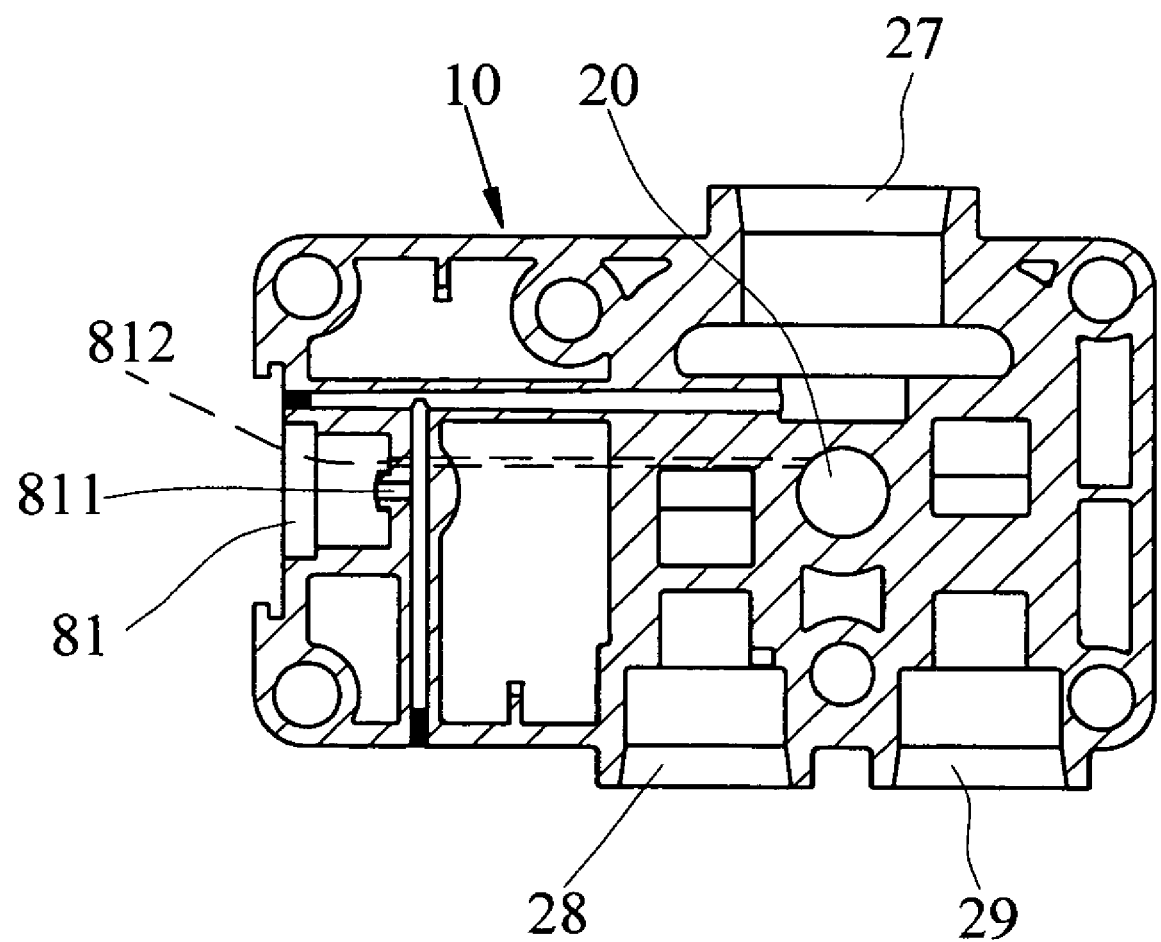
FIG. 2C is a cross-sectional side perspective view of the body of the valve in FIG. 2A.

The body 10 (as shown in FIGS. 2A-2C) has the first blind hole 20 and a first positioning groove 16 and a second positioning groove 17 respectively defined at two opposite sides of the first blind hole 20 on a front face of the body 10. Each of the positioning groove 16, 17 has a first penetrating hole 21 and a second penetrating hole 22 at its center to extend to a back side of the body 10. The first positioning groove 16 has two ends respectively defined with the second blind hole 23 and the third blind hole 24 and the second positioning groove 17 has two ends respectively defined with the fourth blind hole 25 and the fifth blind hole 26. A first passageway 27 is defined in one side face of the body 10 to communicate with the third blind hole 24 and the fifth blind hole 26 and a second passageway 28 is defined in another side face of the body 10 to communicate with the second blind hole 23. Additionally, a third passageway 29 defined in the same side with the second passageway 28 communicates with the fourth blind hole 25. The body 10 further has an end face defined with a valve hole 81 and a first channel 811 and a second channel 812 extending inward from the valve hole 81. The first channel 811 communicates with the first passageway 27 and the second channel 812 communicates with the first blind hole 20. Moreover, the body 10 further has a rear face and a pocket 900 defined in a side edge on the rear face for receiving the bottom board 70 (see FIG. 2B) and particularly has an intermediate hole 11 defined in the rear face to communicate first passageway 27, the third blind hole 24 and the fifth blind hole 26. The intermediate hole 11 is designed particularly in elongated shape to keep the airflow smooth in an interior way composed of the third blind hole 24, the fifth blind hole 26, the first passageway 27 and the first channel 811.

Figure 3A:
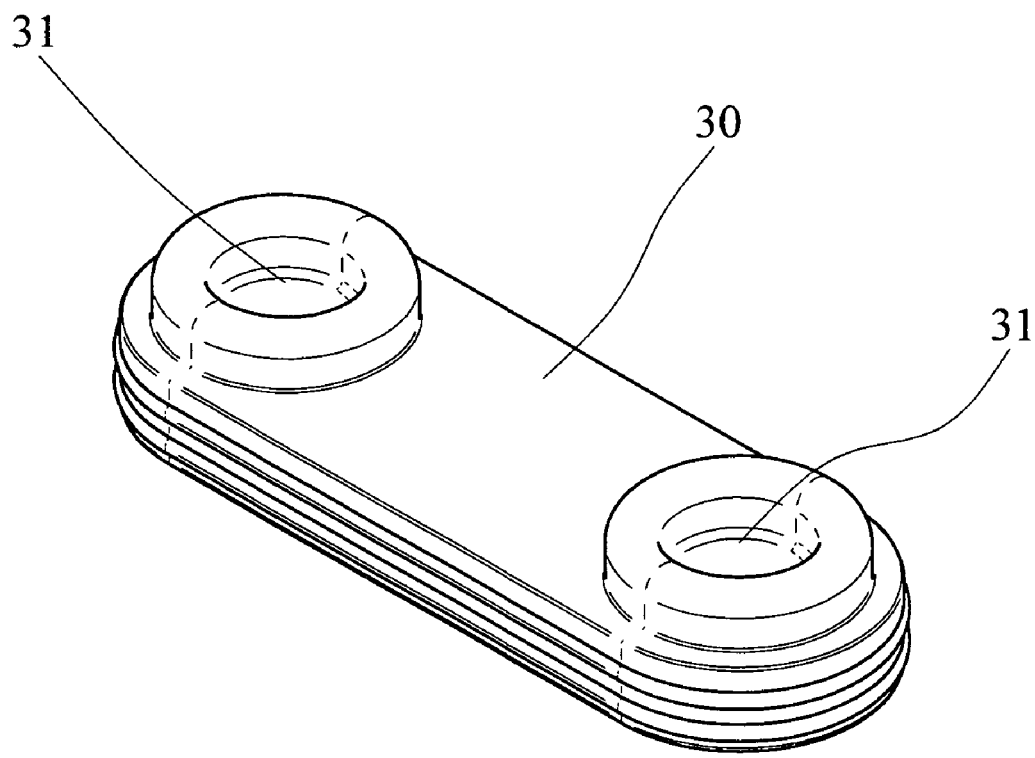
FIG. 3A is a perspective view of a membrane in the valve of the present invention.
Figure 3B:
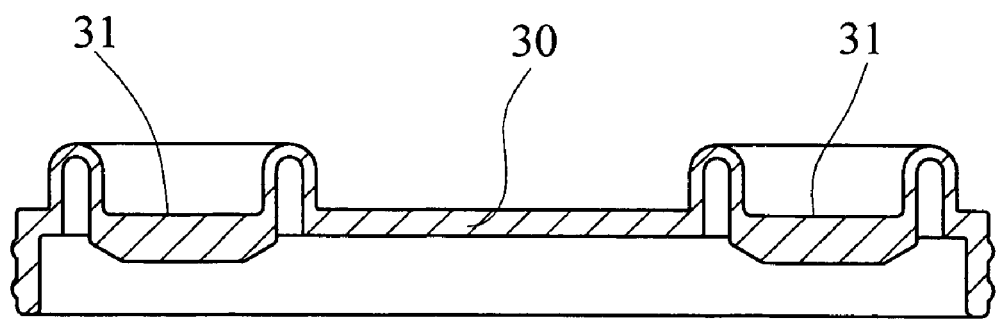
FIG. 3B is a cross-sectional side view of the membrane in the valve in the FIG. 3A.

The two membranes 30 (as shown in FIGS. 3A and 3B) respectively engage the first positioning groove 16 and the second positioning groove 17 in the body 10 and have two ends each with a stop portion 31.

Figure 4:
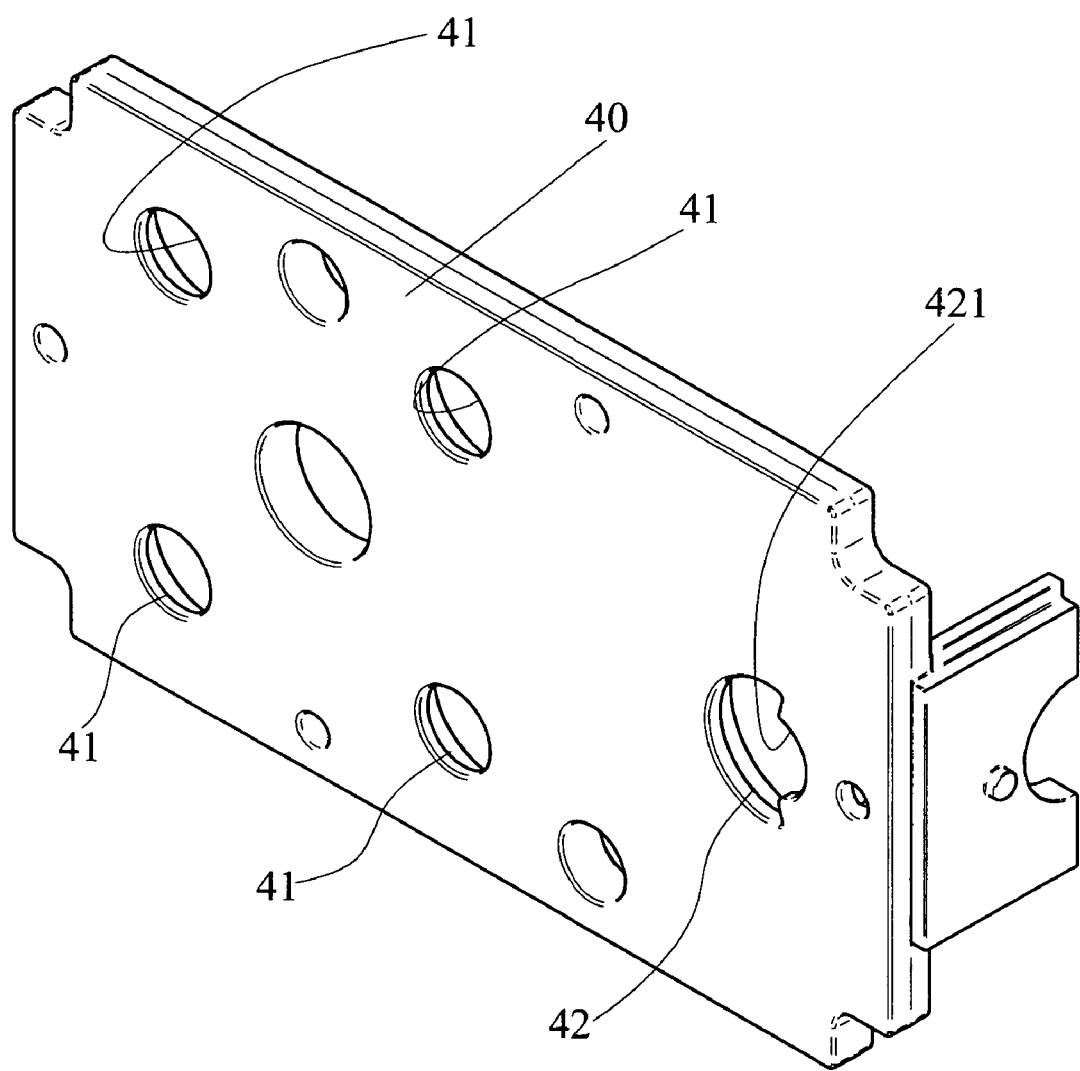
FIG. 4 is a perspective view of a positioning plate in the valve of the present invention.

The positioning plate 40 (as shown in FIG. 4) is attached between the body 10 and the outer shell 6 and has multiple through holes 41 defined thereon.

The bottom board 70 (as shown in FIGS. 8A to 8D) fits within the pocket 900 at the rear of the body 10 and has a first face 71 with a first elongated hole 711, a second elongated hole 712, a third elongated hole 713, a fourth elongated hole 714 and a fifth elongated hole 715. Wherein, the second elongated hole 712 has a via hole 77 extending to a second face 72 of the bottom board 70 and the third elongated hole 713 also has a via hole 78 extending to the second face 72. Two side faces of the bottom board 70 have a 3/2 or 5/2 mode marking at corners respectively. Two end faces of the bottom board 70 have a positioning cutout 751, 761 respectively. When the bottom board 70 combines with the body 10, the first elongated hole 711 or the fifth elongated hole 715 is selectively communicates the intermediate hole 11 on the front face of the body 10, wherein the first or fifth elongated hole 711, 715 aligning the intermediate hole 11 is blocked so that the valve can be kept hermetical after assembling. Preferably, the first and fifth elongated holes respectively have an elongated shape corresponding to the intermediate hole 11.

Figure 10:
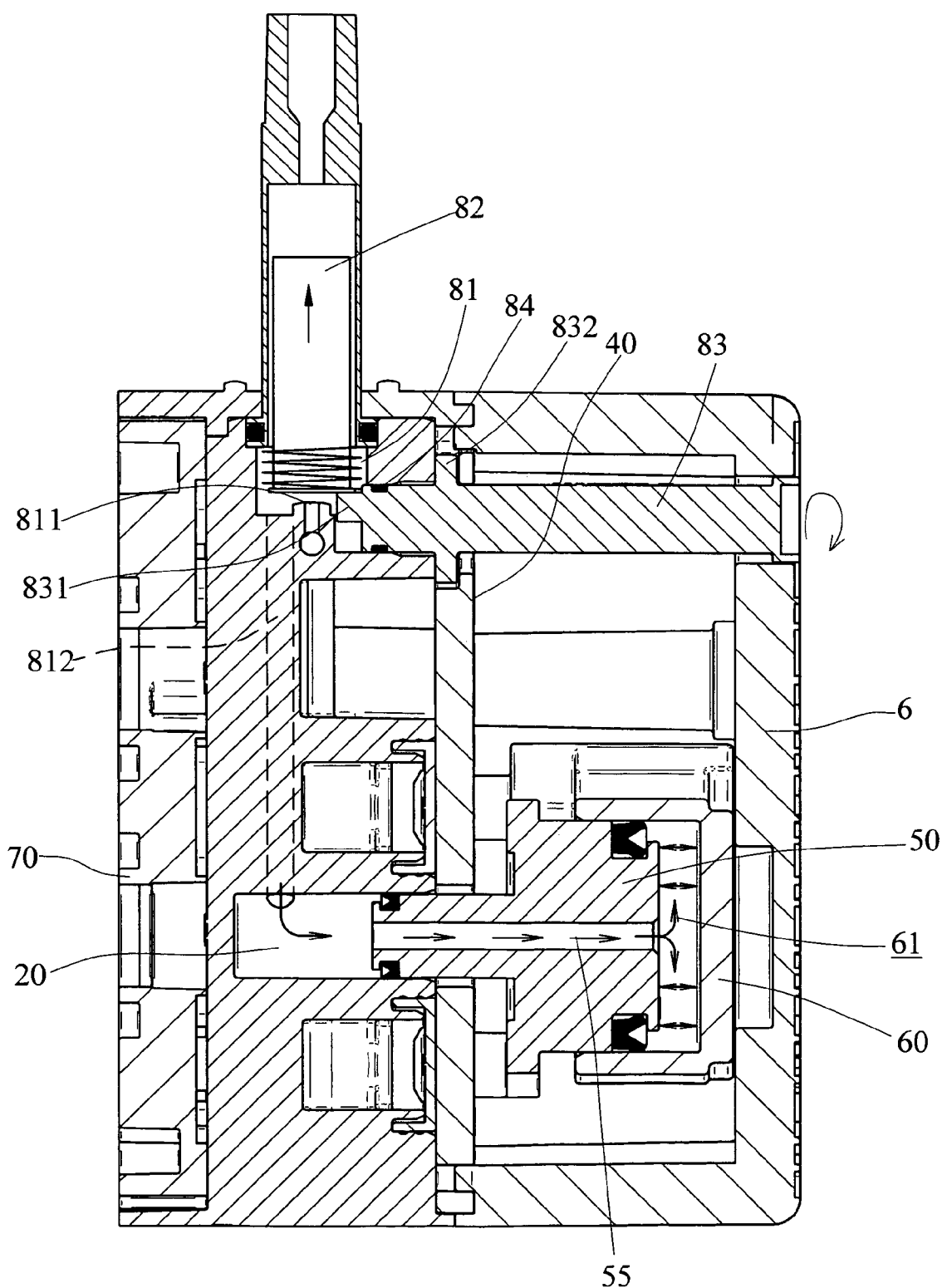
FIG. 10 is another cross-sectional side view of the valve in assembly.
Figure 11A:
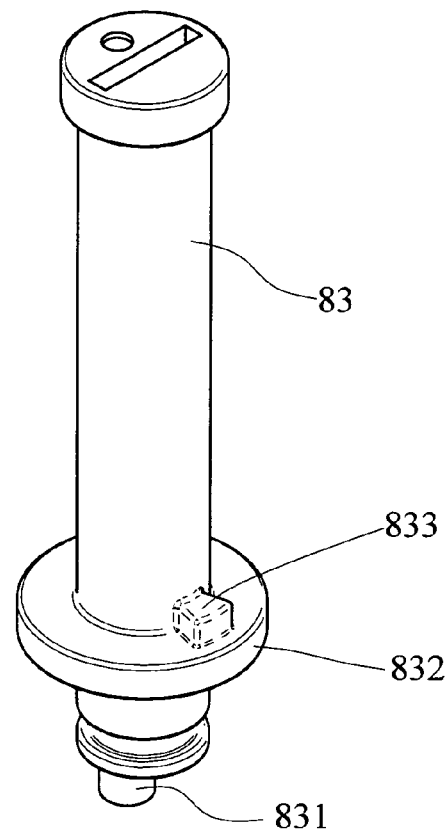
FIG. 11A is perspective side view of a rotating shaft of the valve in the present invention.
Figure 11B:
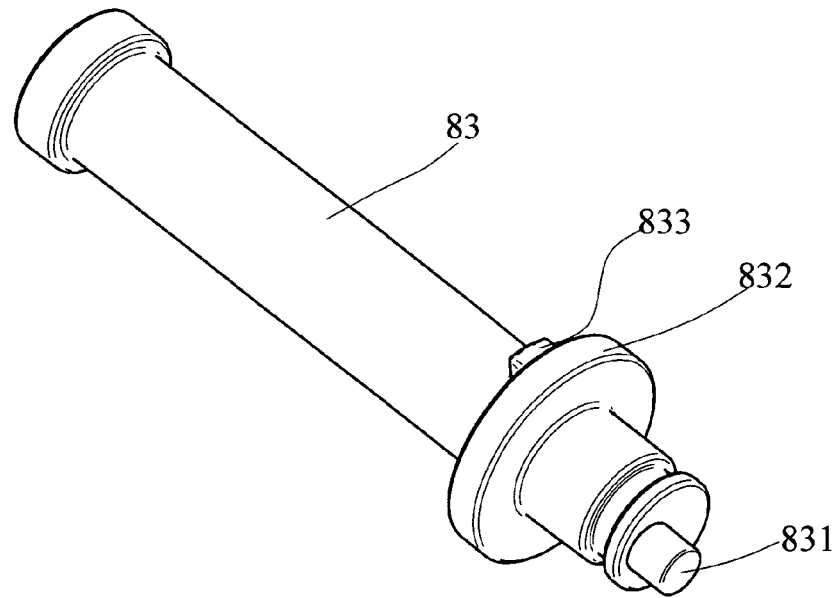
FIG. 11B is another perspective side view of the rotating shaft of the valve in opposite to FIG. 11A.

The electromagnetic valve 80 (as shown in FIG. 9) is assembled in an end face of the body 10 and has a shaft 82 (as shown in FIG. 10) extending into a first channel 811 defined in the body 10, wherein the body 10 further has a second channel 812 defined in a deeper location of the body 10. A manual rotating shaft 83 (as shown in FIGS. 10, 11A and 11B) penetrates the outer shell 6 into a valve hole 81 and has a bias trigger 831 formed at its front end to press the bottom face of the valve shaft 82. When the electromagnetic valve 80 actuates to lift the valve shaft 82, the first channel 811 communicates with the second channel 812 (as shown in FIG. 2C). When the electricity is in cutoff, the bias trigger 831 drives the valve shaft 82 to arise so that the channels 811, 812 still communicate with each other.

Figure 8A:
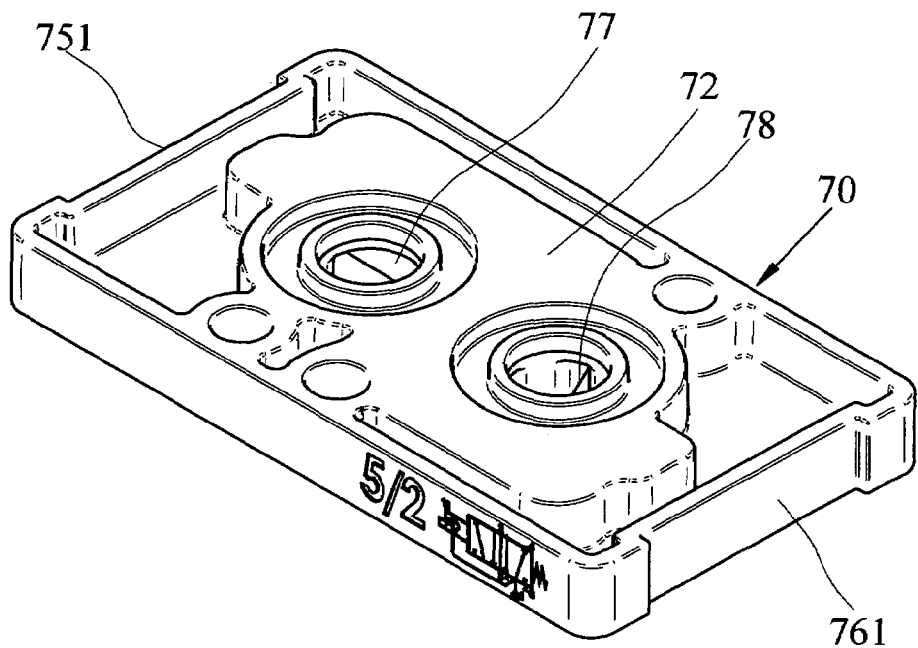
FIG. 8A is a perspective view of a bottom board of the valve in the present invention.
Figure 8B:
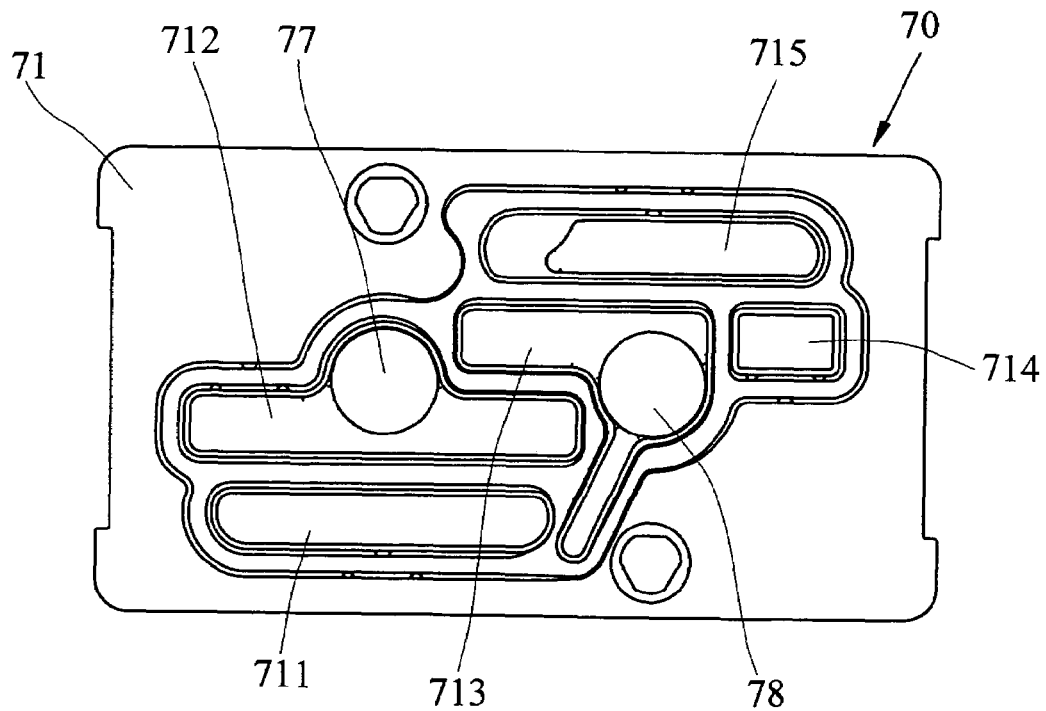
FIG. 8B is a plane view of a first surface of the bottom board.
Figure 8C:
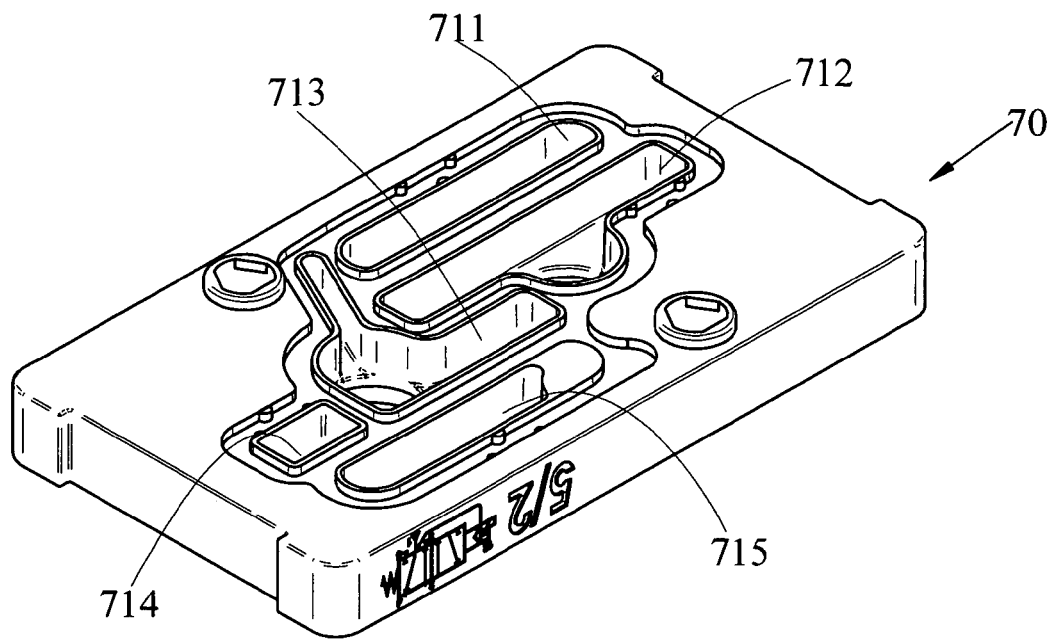
FIG. 8C is perspective view of the bottom board at one rotating location.
Figure 8D:
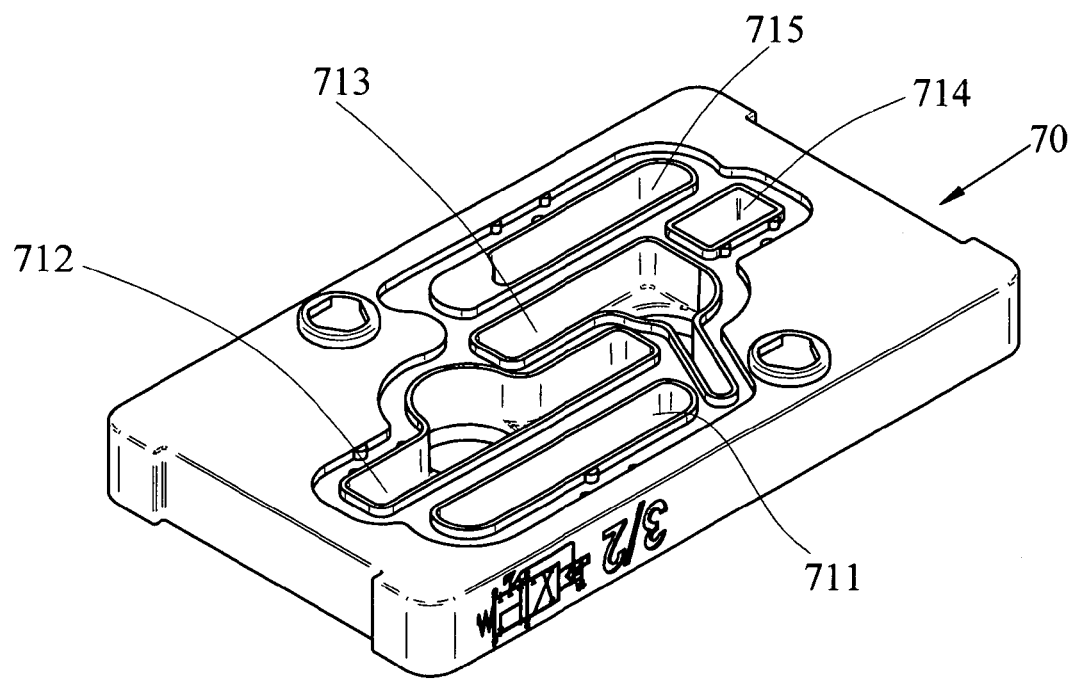
FIG. 8D is perspective view of the bottom board at another rotating location.
Figure 13:
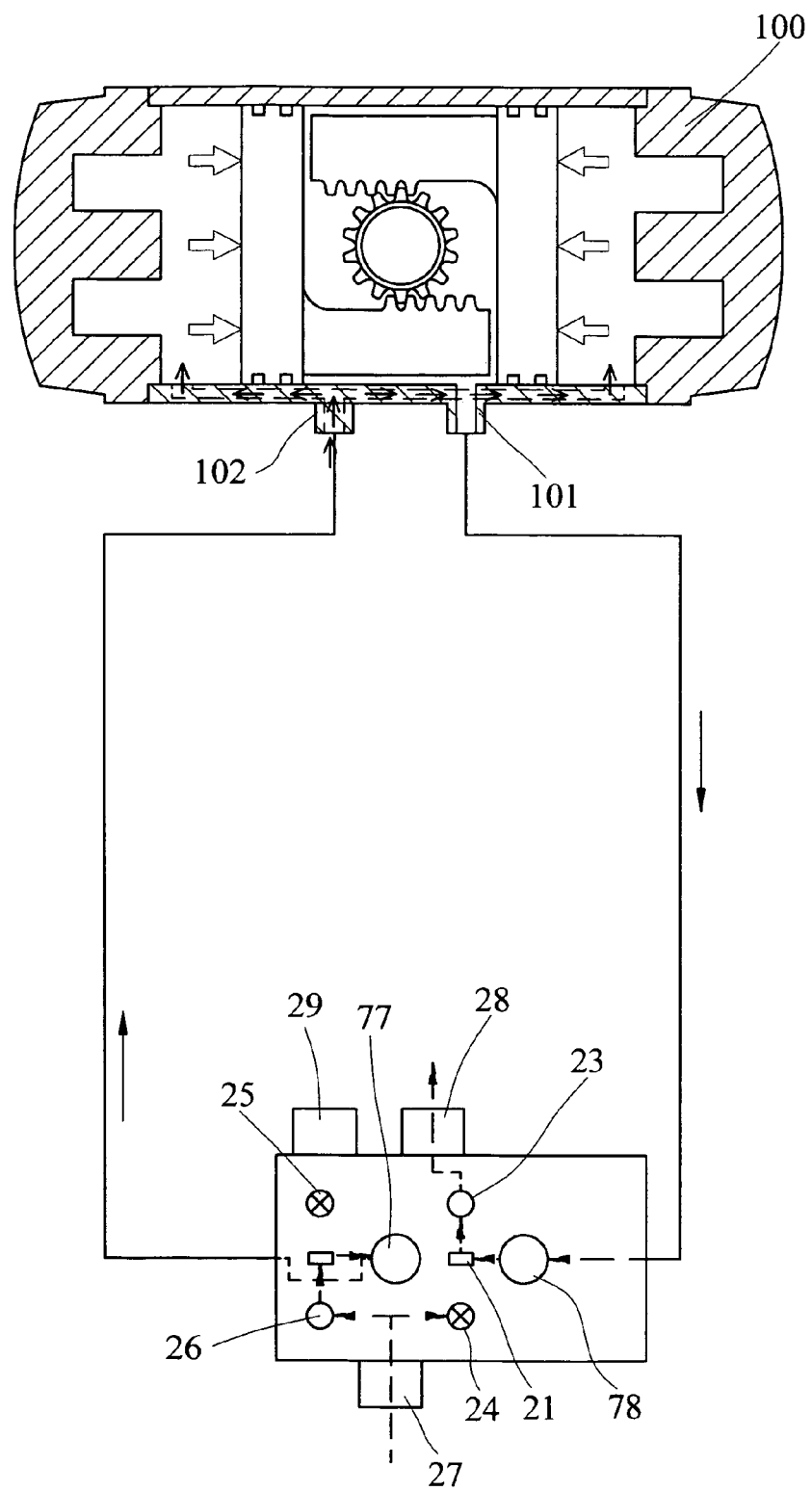
FIG. 13 is an operationally schematic view of the valve set at "5-way, 2-position" of operational mode without electricity.

In the 5/2 operation mode (5-way, 2-position, wherein the term "way" includes all inlets and outlets of the valve and the term "position" represents all shiftable locations of the valve), the body 10 has a window 131 (as shown in FIG. 1) to read the 5/2 mode marking on the bottom board 70. The via holes 77, 78 respectively communicate with two ways 101, 102 on a actuator component 100 (as shown in FIGS. 8A and 13). The electromagnetic valve 80 installed inside the body 10 can open or close the first channel 811 (as shown in FIGS. 9 and 10).

With reference to FIG. 13, when the electromagnetic valve 80 is not actuated, the two resilient bodies 64 push the external sliding base 60 toward the membrane 30 to make the outer abutting stubs 62 press the stop portions 31 on the two membranes 30 to seal the third blind hole 24 and the fourth blind hole 25 in the body 10. High-pressure fluid is injected into the body via the first passageway 27, flows through the fifth blind hole 26 to pass the membrane 30, passes the second penetrating hole 22, the second elongated hole 712 in the bottom board 70, and enters the actuator component 100 via the via hole 77 and one way 102. Another way 101 of the actuator component 100 discharges, i.e. the via hole 78 in the bottom board 70 has discharging efficiency to release the fluid, wherein the fluid passes the third elongated hole 713 in the bottom board 70, the first penetrating hole 21 in the body 10 for passing the membrane 30, and second blind hole 23 to thus be discharged via the second passageway 28.

Figure 12:
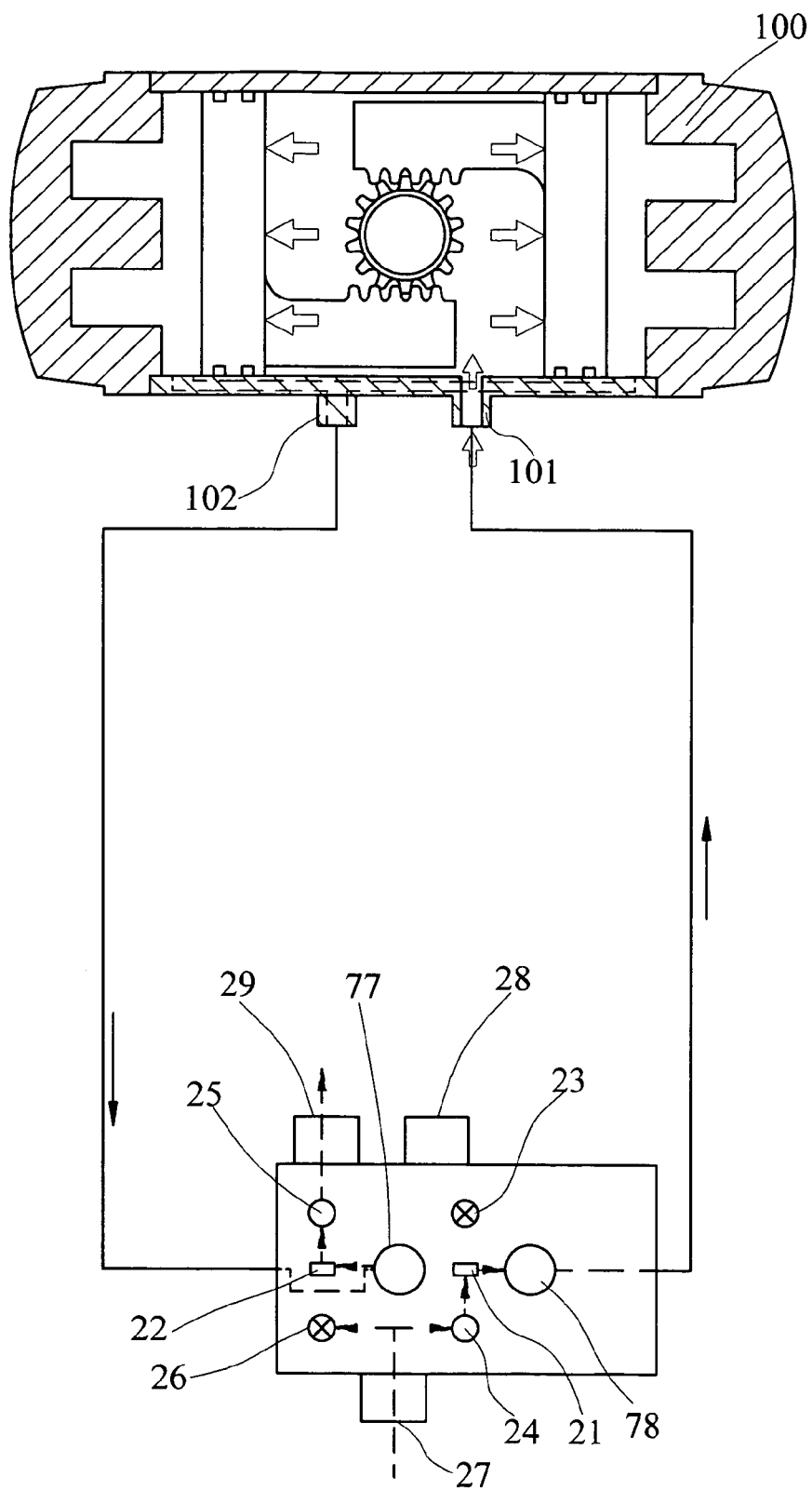
FIG. 12 is an operationally schematic view of the valve set at "5-way, 2-position" of operational mode with electricity.

With reference to FIG. 12, when the actuator component 100 is switched to change the gas inlet and outlet, the electromagnetic valve 80 drive the valve shaft 82 to arise and to open the first channel 811. The high-pressure fluid from the first passageway 27 is allowed to enter the second channel 812, the first blind hole 20 and then go into the recess 61 in the external sliding base 60 via the through hole 55 in the internal sliding base 50 (as shown in FIG. 10). By the high pressure of the fluid, the external and internal sliding bases 50, 60 are propped out to make the external sliding base 60 compress the two resilient bodies 64 and to make the internal sliding base 50 abut the two membranes 30 as well. Thereby, the stop portions 31 on the two membranes 30 close the second blind hole 23 and the fifth blind hole 26 in the body 10. The fluid enters the third blind hole 24 via the first passageway 27 to pass the corresponding membrane 30, passes the first penetrating hole 21 in the body 10, the third elongated hole 713 in the bottom board 70 and further enters the way 101 of the actuator component 100 via the via hole 78 to perform a fluid-injecting status. The another way 102 of the actuator component 100 communicated with the via hole 77 in the bottom board 70 is in a fluid-releasing status, wherein the fluid passes the second elongated hole 712 on the bottom board 70 via the via hole 77, the second penetrating hole 22 in the body 10 to pass the corresponding membrane 30, the fourth blind hole 25 and then discharges via the third passageway 29.

Figure 15:
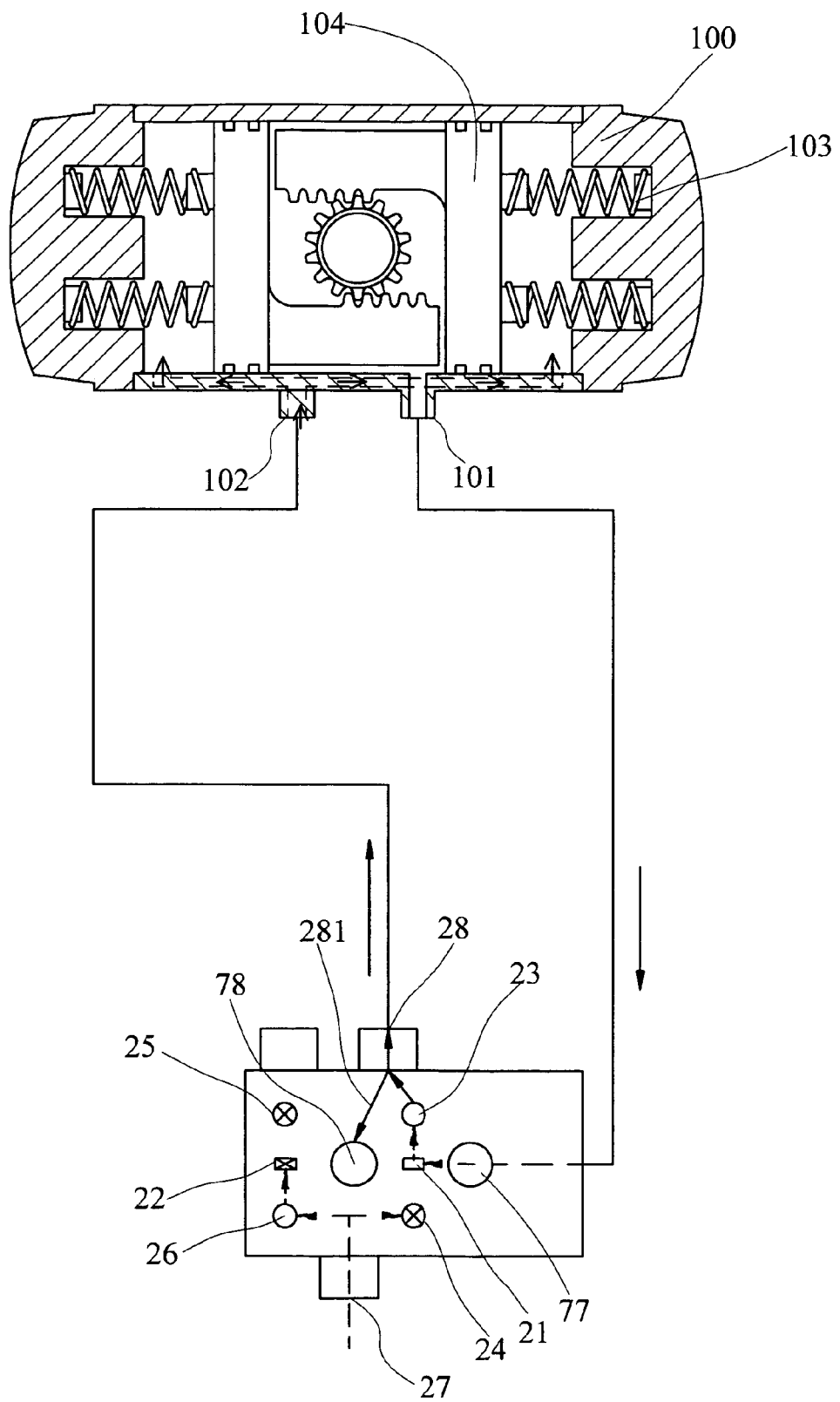
FIG. 15 is an operationally schematic view of the valve set at "3-way, 2-position" of operational mode without electricity.

With reference to FIG. 15, when the valve is operated in 3/2 mode, the bottom board 70 is rotated 180° to engage into the body 10. The 3/2 mode marking can be observed by the window 131. The two outer abutting stubs 62 on the external sliding base 60 press the stop portions 31 of the two membranes 30 to close the first blind hole 24 and the fourth blind hole 25 in the body. The fluid is injected via the first passageway 27, enters the fifth blind hole 26 to pass the corresponding membrane 30 and passes the second penetrating hole 22 that is communicated with the fourth elongated hole 714 in the bottom board 70. Because the fourth elongated hole 714 is closed, the fluid injection is terminated. The actuator component 100 further has a spring 103 to restitute a piston 104 therein. When the fluid injection at the way 101 is terminated, the spring 103 pushes the piston 104 to allow the way 101 discharging fluid, wherein the fluid sequentially enters the second elongated hole 712 via the via hole 77 in the bottom board 70, goes through the first penetrating hole 21 to pass the corresponding membrane 30, passes the second blind hole 23 to the second passageway 28 that is return communicated with the way 102 of the actuator component 100 to recycle parts of the fluid and to make sure not to conduct polluted fluid from outside so that the spring does not corrode easily. Additionally, the second passageway 28 communicates to a bypass 281 of the second face 12 (as shown in FIG. 2B), wherein the bypass 281 is closed by the bottom board 70 in the 5/2 operation mode but aligns with the third elongated hole 713 in the bottom board 70 in the 3/2 operation mode to allow the fluid discharging via the third elongated hole 713 and the via hole 78 so that a discharging efficiency can be achieved when the actuator component 100 has no fluid injection.

Figure 14:
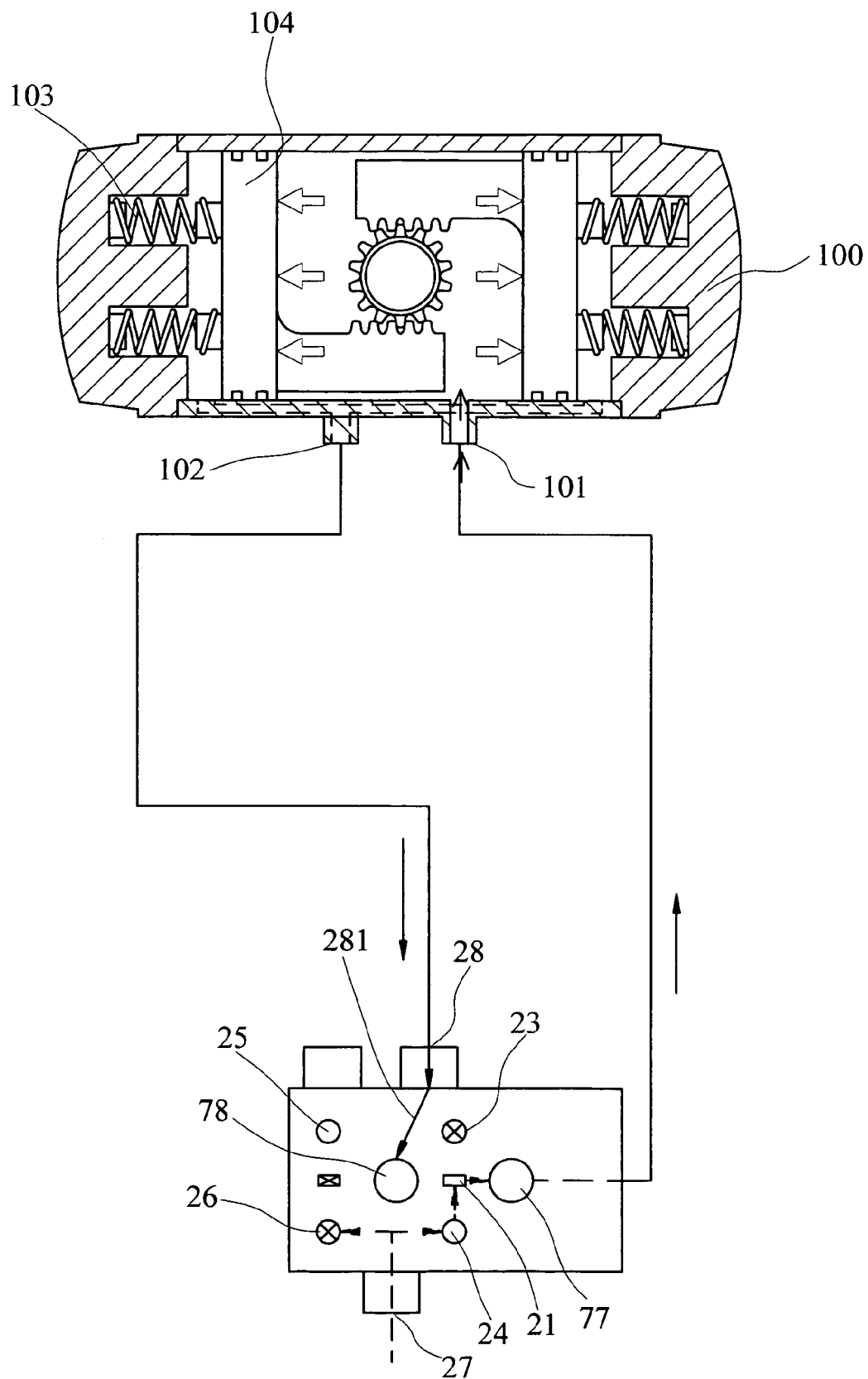
FIG. 14 is an operationally schematic view of the valve set at "3-way, 2-position" of operational mode with electricity.

With reference to FIG. 14, a reverse fluid injection after the actuator component 100 discharging is shown, wherein the electromagnetic valve 80 controls communication of the first channel 811 and the second channel 812 and also controls movements of the internal and external sliding bases 50, 60. The internal sliding base 50 presses the two membranes 30 to keep the stop portions 31 of the membranes 30 correspondingly close the second blind hole 23 and the fifth blind hole 26 in the body 10. The first passageway 27 on the body 10 conducts the fluid to enter the third blind hole 24 and to pass the corresponding membrane 30. Then, the fluid enters the first penetrating hole 21 to achieve the fluid injection. The high-pressure fluid flows from the first penetrating hole 21 to the second elongated hole 712 and the via hole 77 in the bottom board 70. Because the via hole 77 of the bottom board 70 communicates the way 101 of the actuator component 100, the high-pressure fluid drives the piston 104 and compresses the spring 103 at the same time to make the way 102 discharge, wherein the fluid is discharged by the path composed of the second passageway 28, the bypass 281 and the third elongated hole 713 and the via hole 78 in the bottom board 70.

With reference to FIG. 2A, the body 10 has the sixth blind hole 111 communicated with the valve hole 81. The position plate 40 has a sunken hole 42 corresponding to the sixth blind hole 111. The sunken hole 42 has an arc protrusion 421 (as shown in FIG. 4) on an inner periphery of the sunken hole 42. The outer shell 6 correspondingly has an opening 65 (as shown in FIGS. 5A and 5B). The rotating shaft 83 further has a disk 832 corresponding engaged the sunken hole 42 (as shown in FIGS. 11A and 11B), wherein the disk 832 has blocks 833 extending to the arc protrusion 421. The rotating shaft 83 engages the sixth blind hole 111 of the body 10 and further has an O-ring 84 (as shown in FIG. 10) for anti-leakage and a free end extending out of the outer shell 6 via the opening 65.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. A valve comprising:
   an outer shell with an interior;
   an external sliding base assembled inside the interior of the outer shell and having two ends, a recess defined at one end, two outer abutting stubs formed at two opposite sides of the recess, two detents defined in the other end to respectively align the two outer abutting stubs;
   a resilient body clamped between the outer shell and a middle between the two detents;
   an internal sliding base engaging the external sliding base and having a sliding portion mounted in the recess in the external sliding base, two inner abutting stubs formed at a bottom of the sliding portion, a central shaft extending from the internal sliding base, and a through hole axially defined in the central shaft;
   a positioning plate attached between the body and the outer shell and having multiple through holes defined in the positioning plate;
   a body combined with the outer shell and has a first blind hole and a first positioning groove and a second positioning groove respectively defined at two opposite sides of the first blind hole, wherein each of the first and second positioning grooves has a first penetrating hole and a second penetrating hole; the first positioning groove has two ends defined with a second blind hole and a third blind hole respectively; the second positioning groove has two ends defined with a fourth blind hole and a fifth blind hole respectively; a first passageway communicates the third blind hole and the fifth blind hole; a second passageway communicates with the second blind hole; a third passageway communicates the fourth blind hole; a valve hole contains a first channel and a second channel communicated with the first passageway and the first blind hole respectively; an electromagnetic valve is installed inside the shell to control the valve hole;
   two membranes respectively engaged the first positioning groove and the second positioning groove on the body, wherein two ends of each of the two membranes respectively have a stop portion to cover the second, third, fourth, or fifth blind hole; and
   a bottom board rotatably mounted inside the body and having a first face with a first elongated hole, a-second elongated hole, a third elongated hole, a fourth elongated hole and a fifth elongated hole, wherein the second elongated hole extends to a second face on the bottom board, the third elongated hole has a via hole extending to the second face of the bottom board, the fourth elongated is closed;
   wherein, the two outer abutting stubs on the external sliding base penetrate two corresponding through holes on the positioning plate and each have a distal end to engage the third blind hole and the fourth blind hole on the body;
   wherein, the two inner abutting stubs on the internal sliding base penetrates two corresponding through holes on the positioning plate and each have a distal end to engage the second blind hole and the fifth blind hole;
   wherein, the central shaft on the internal sliding base sequentially penetrates one corresponding through hole on the positioning plate and the first blind hole in the body.

2. The valve as claimed in claim 1, wherein the bottom board is rotatably mounted to the body to switch between a "3-way, 2-position" operation mode and a "5-way, 2-position" operation mode with 180° rotation.

3. The valve as claimed in claim 2, wherein the fifth elongated hole in the bottom board aligns with the third blind hole and the fifth blind hole in the body, the fourth elongated hole in the bottom board aligns with the second penetrating hole in the body, the second elongated hole in the bottom board aligns with the first penetrating hole in the body, and the second passageway on the body has a bypass communicated with the third elongated hole in the bottom board when the valve is in "3-way, 2-position" operation mode.

4. The valve as claimed in claim 2, wherein the first elongated hole in the bottom board aligns with the third blind hole and the fifth blind hole in the body, the second elongated hole in the bottom board aligns with the second penetrating hole in the body, and the third elongated hole aligns with the first penetrating hole in the body when the valve is in "5-way, 2-position" operation mode.

5. The valve as claimed in claim 1, wherein the body further comprises a window and the bottom board has markings of operation modes shown on a side of the bottom board to be observed via the window.

6. The valve as claimed in claim 1, wherein the electromagnetic valve further comprises a manual rotating shaft and a valve shaft that inserts into the valve hole to close the first channel in the body when the electromagnetic valve is combined with the body.

7. The valve as claimed in claim 6, wherein the manual rotating shaft penetrates an opening on the outer shell, a sunken hole in the positioning plate and a corresponding blind hole in the body to reach the valve hole and has a front end with a bias trigger to abut a bottom of the valve shaft and operationally drive the valve shaft to arise.

8. The valve as claimed in claim 7, wherein the manual rotating shaft further has an O-ring fit in with the corresponding blind hole in the body.

9. The valve as claimed in claim 1, wherein the sliding portion on the internal sliding base further has a shoulder section and the two inner abutting stubs formed at two opposite sides of the shoulder section.

10. The valve as claimed in claim 1, wherein the central shaft and the sliding portion on the internal sliding base respectively engage with an O-ring.

11. The valve as claimed in claim 1, wherein the body further has a rear face, a pocket defined in a side edge on the rear face for receiving the bottom board, and an intermediate hole defined in the rear face to communicate first passageway, the third blind hole and the fifth blind hole and selectively aligning the first elongated hole or the fifth elongated hole that is blocked.

12. The valve as claimed in claim 1, wherein the intermediate hole is corresponding to the first elongated hole or the fifth elongated hole in shape.

* * * * *